United States Patent [19]

Smith

[11] Patent Number: 5,195,482

[45] Date of Patent: Mar. 23, 1993

[54] METHOD FOR REMOVING INJECTOR NOZZLE DEPOSITS

[75] Inventor: Darren A. Smith, Doubleview, Australia

[73] Assignee: Orbital Engine Company (Australia) Pty. Limited, Western Australia, Australia

[21] Appl. No.: 768,759

[22] PCT Filed: Apr. 19, 1990

[86] PCT No.: PCT/AU90/00158
§ 371 Date: Oct. 15, 1991
§ 102(e) Date: Oct. 15, 1991

[87] PCT Pub. No.: WO90/12954
PCT Pub. Date: Nov. 1, 1990

[30] Foreign Application Priority Data

Apr. 20, 1989 [AU] Australia ............... PJ3801

[51] Int. Cl.⁵ ............................................. F02B 77/00
[52] U.S. Cl. .................................. 123/198 A; 123/305
[58] Field of Search ................... 123/305, 294, 198 A, 123/467

[56] References Cited

U.S. PATENT DOCUMENTS 4,359,025 11/1982 Zeliszkewycz ...................... 123/294
4,782,808 11/1988 Bostick et al. ....................... 123/467
4,817,873 4/1989 McKay .

FOREIGN PATENT DOCUMENTS 11209 of 1928 Australia .
14839 8/1964 Australia .

Primary Examiner—Noah P. Kamen
Attorney, Agent, or Firm—Nikaido, Marmelstein, Murray & Oram

[57] ABSTRACT

A method and apparatus for operating an internal combustion engine fuel injection system wherein fuel is cyclically injected directly into an engine combustion chamber though a selectively openable nozzle, whereby the nozzle is periodically maintained open while no fuel is being delivered through the nozzle and while the gas in the combustion chamber is at a temperature and pressure so that gas from the combustion chamber will pass into the open nozzle means to raise the temperature thereof sufficient to combust contaminate deposits thereon.

25 Claims, 2 Drawing Sheets

METHOD FOR REMOVING INJECTOR NOZZLE DEPOSITS

BACKGROUND OF THE INVENTION

1. Field of the Invention

This invention relates to a fuel injection system for direct injection into the combustion chamber of an internal combustion engine through a valve controlled port.

The characteristics of the spray of the fuel droplets issuing from a nozzle into a combustion chamber have major effects on the efficiency of the burning of the fuel, which in turn affects the stability of the operation of the engine, the engine fuel efficiency and the composition of the engine exhaust gases. To optimise these effects, particularly in a spark ignited engine, the desirable characteristics of the spray pattern of the fuel issuing from the nozzle include small fuel droplet size, controlled penetration of the fuel spray into the chamber, and at least at low engine loads, a relatively contained ignitable cloud of fuel vapour in the vicinity of the spark plug.

Some known injection nozzles, used for the delivery of fuel directly into the combustion chamber of an engine, are of the poppet valve type, from which the fuel usually issues in the form of a conical spray, with the fuel droplets forming a generally continuous conical wall extending from the peripheral edge of the poppet valve.

The nature of the shape of the fuel spray is dependent on a number of factors including the geometry of the port and valve constituting the nozzle, especially the surfaces of the port and valve immediately downstream of the seat where the port and valve engage to seal when the nozzle is closed. Once a nozzle geometry has been selected to give the required spray pattern, relatively minor departures from that geometry can impair the engine performance. In particular the build-up of solid combustion products on surfaces over which the fuel flows is detrimental to the desired spray pattern and correct performance of the nozzle.

When build-up does occur it is normally not of a uniform nature around the peripheral extent of the surface of the nozzle over which the fuel flows, thus severely disturbing the symmetry of the fuel spray.

2. Description of the Relate Art

It is known that build up on the surface of the injection nozzle, such as carbon deposits, can be removed or the formation thereof controlled, if the relevant surface of the nozzle is exposed to temperature conditions sufficient to burn off the build up of contaminants such as carbon. However, the cooling effects of the adjacent walls of the combustion chamber, which are frequently water or air cooled, and the cooling effect of the fuel being delivered through the nozzle, are such that under normal operating conditions, the relevant surfaces of the nozzle do not reach a sufficiently high temperature to effect removal of the contaminants that may build up on the surfaces of the nozzle.

There have previously been proposals to construct the delivery area of the nozzle so as to restrict the heat flow path therefrom in the endeavour to raise the temperature of the relevant surfaces where contaminants may build up. A typical example of such nozzle constructions is to be found in U.S. Pat. No. 4,817,873. These proposals have met with varying degrees of success, but have the major problem that the useful life of the nozzle is seriously reduced as a result of the relevant areas being maintained for long periods at the higher temperature necessary to effect removal of the contaminants.

There is disclosed in U.S. Pat. No. 4,395,025 a direct injected internal combustion engine wherein a mechanically operated injector nozzle is cyclically opened and closed to permit delivery of fuel to the combustion chamber. The delivery of the fuel is effected by a high pressure charge of combustion gases from the combustion chamber which is delivered into a fuel chamber in the injector body by maintaining the injector nozzle open for an extended period after completion of the injection of the fuel into the combustion chamber. Upon the initial opening of the injector nozzle, the pressure of the gas in the fuel chamber is sufficiently above the compression pressure in the combustion chamber to discharge the vapourised fuel from the fuel chamber into the combustion chamber. Ignition and combustion of the fuel subsequently commences and the injector nozzle is maintained in the open position well into the combustion period so that the hot high pressure gases generated by combustion will flow into the fuel chamber and be subsequently trapped therein on closing of the injector nozzle. The trapped hot gases are at a pressure sufficient to effect injection of the fuel during the next engine cycle, where such injection is timed to occur at a point in the compression stroke when the pressure in the combustion chamber is below the pressure of the gas trapped in the fuel chamber.

In this proposal, a charge of high temperature, high pressure combustion gas is delivered to the fuel chamber each cycle o the engine and fuel is constantly delivered into the injector chamber through a permanently open metering orifice. The metering of the fuel is effected by the fixed size orifice and a variable pressure pump supplying fuel to that orifice.

It is to be noted that the proposal in U.S. Pat. No. 4,359,025 does not deal with the problem of the build up of deposits in the injector nozzle, which adversely influence the spray pattern of the fuel delivered to the nozzle, and is primarily directed to mixing the fuel with high temperature gas to effect vapourisation thereof prior to delivery through the nozzle to the combustion chamber. There is no discussion in this disclosure of the problem arising from the build up of solid contaminants in the nozzle or a solution to this problem. It is considered that in the light of experience, the high temperature conditions in the fuel chamber, generated by the presence of combustion products therein together with unburnt fuel would lead to the generation of solid and-/or gum deposits which would seriously impair the operation of the injector. In particular, it is considered that gum deposits would be generated in the upper pressure chamber wherein a piston operates to effect closure of the injector nozzle. This could lead to sticking of the piston and hence potential ineffective closing of the injector nozzle. Further it is believed that there would be a build up of deposits in fuel metering orifice and the passage leading therefrom, which would adversely effect the accuracy of the fuel metering system.

SUMMARY OF THE INVENTION

It is therefore the object of the present invention to provide a method of operating an internal combustion engine direct fuel injection system so as to control the build-up of contaminants in those areas which would influence the spray pattern of the fuel being delivered through the injection nozzle to the engine.

With this object in view there is provided a method of operating an internal combustion engine fuel injection system wherein fuel is cyclically injected directly into an engine combustion chamber through a selectively openable nozzle means, the method including controlling the operation of the nozzle means to periodically maintain the nozzle means open while fuel is not delivered to or through the nozzle means and during a portion of at least one cycle when the gas in the combustion chamber is at a temperature and pressure so that gas from the combustion chamber will pass into the open nozzle means to raise; the temperature thereof sufficient to combust contaminate deposits thereon.

Normally it is considered that carbon and other contaminant deposits on the surface of injection nozzles will be burned off at a temperature of above about 400° C., however, the actual temperature required to remove the contaminants will be dependent upon the nature of the contaminants including the composition and physical form thereof. Gum deposits and finely divided particles will ignite at a lower temperature than hard compacted particles. The nature of the contaminant is in part related to the length of the period of operation of the engine between successive nozzle cleaning operations.

Also, care must be taken to ensure that the relevant surfaces of the nozzle are not heated to a temperature which would adversely affect the physical properties of the material from which the components of the nozzle are manufactured. Usually such nozzle components are manufactured from heat treated stainless steel, and care must be taken to ensure that such components are not heated to a temperature which will temper or soften the stainless steel, particularly on the surfaces constituting the valve and valve seat of the nozzle.

It has been found that effective cleaning of the nozzle means can normally be achieved with combustion gas temperatures in the range of about 45° to 700° C., preferably in the range of about 500° to 600° C.

Conveniently the nozzle means is maintained open for a period in each of a plurality of engine cycles, preferably successive engine cycles. Preferably the nozzle means is maintained open while the engine is operating in a selected area that is with no substantial change in engine operating area that is with no substantial change in engine load or speed, particularly no increase in load. The cleaning may be carried out while the engine is operating in an over-run condition.

An over-run condition, as used herein, is a term widely used in the automotive field and describes a situation when the vehicle is driving the engine, rather than the engine driving the vehicle. In other words, when the driver lifts his foot off of the accelerator pedal when the vehicle is travelling at a significant speed, the momentum of the vehicle maintains the forward motion of the vehicle at a speed which forces the engine to maintain a speed greater than the idle speed of the engine. Therefore, the vehicle drives the engine, and this situation is commonly termed "over-run".

The temperature of the gas in the combustion chamber resulting from the maximum compression pressure of the gas, even without combustion of fuel, can be sufficiently high to raise the temperature of contaminants on those surfaces of the nozzle exposed directly to the gas, while the nozzle is open, to remove these contaminates by combustion thereof. However this is dependent on the compression ratio of the engine being high enough to raise the combustion chamber gas to a temperature above about 450° C.

Preferably, the timing of the commencement of the normal injection period remains unaltered and fuel is injected in the normal manner However, the period of opening of the injector nozzle is extended to include an appropriate time in the compression cycle to deliver high temperature gas into the nozzle.

In one form of control of the fuel injection system, the timing of the period of opening of the injector nozzle is adjusted to late in the compression stroke where the temperature of the compressed gases will be sufficiently high to burn off the contaminant deposits.

In a multi cylinder engine the injector nozzle of the respective cylinders may undergo the cleaning treatment at different times, particularly when the cleaning treatment is carried out while the engine is operating under load.

The frequency at which the cleaning operation is implemented can be programmed into the ECU, which normally controls the operation of the fuel injection system, so that the nozzle cleaning procedure is implemented on a regular time interval basis, or on the basis of the completion of a selected number of engine cycles. The ECU may also be programmed so that the cleaning procedure is not initiated immediately on the expiry of the set time or number of cycles, but will occur when next the engine is in a particular operating condition after the expiry of such time interval or number of cycles. The time interval or number of cycles may each be determined on an approximate basis on the number of revolutions of the engine.

In one embodiment of the invention as applied to an internal combustion engine of a vehicle, it is proposed that the cleaning procedure be implemented approximately each 1,500 kilometers of travel of the vehicle, and the passage of this distance can be approximated by counting the number of cold engine start-ups. Statistically it is considered that normally a motor passenger vehicle travels about 10 kilometers for each cold start-up and thus in 150 cold starts of the engine, the vehicle will have travelled approximately 1,500 kilometers. The ECU controlling the fuel injection system can readily be programmed to count the number of cold starts of the engine and to initiate the nozzle cleaning procedure each 150 starts.

Further, in the motor vehicle application, the cleaning cycle may be carried out whilst the engine is operating in a steady state, such as cruising at a selected road speed, say 90 to 95 kph. Thus upon the ECU determining that the 150 cold starts have been effected, it will then implement the injector nozzle procedure when the engine is operating in a load range indicating the vehicle is cruising and in the 90 to 95 kph speed range, which can be determined from the normal inputs to the ECU. Also it is preferable that the nozzle cleaning procedure is not initiated whilst the engine is cold, that is within the short period after start up, thus the ECU is also programmed to only implement the nozzle cleaning procedure when the engine is operating above a preselected temperature.

It has been found that when the cleaning procedure is carried out on the basis of the above conditions the injection nozzle is effectively cleaned if the cleaning procedure is allowed to operate for 300 to 500 consecutive cycles of the engine, each open period of the injector nozzle in the cleaning procedure being in the order of 10 to 15 milliseconds, with the engine operating at about 2,000 RPM.

BRIEF DESCRIPTION OF THE DRAWINGS

The invention will be more readily understood from the following description of one practical arrangement of a fuel metering system for an internal combustion engine as illustrated in the accompanying drawings.

In the drawings.

DESCRIPTION OF THE PREFERRED EMBODIMENT

Figure 1:
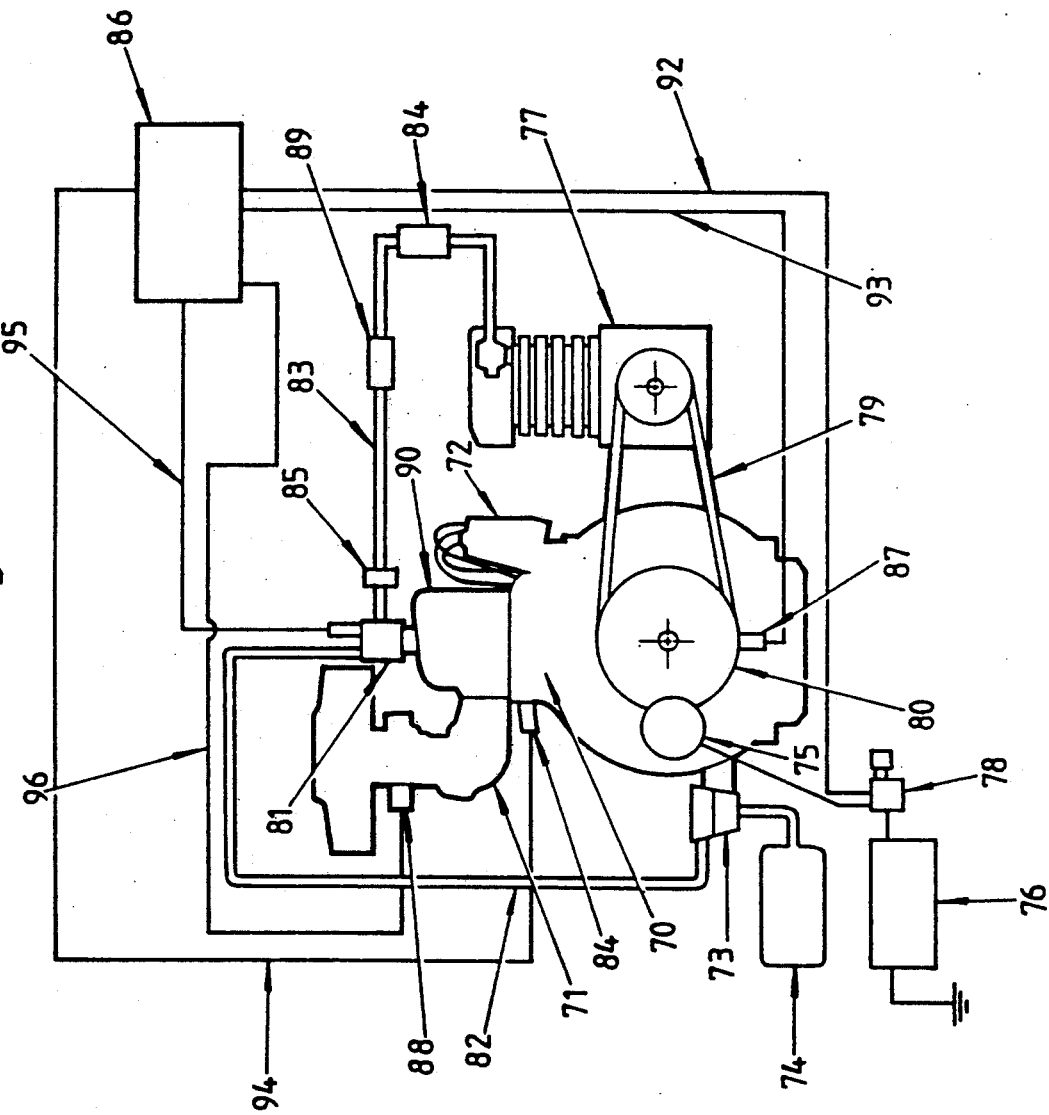
FIG. 1 is a diagrammatic representation of a direct fuel injected engine.

Referring now to FIG. 1, the engine 70 may be of any conventional type, having an air intake system 71, an ignition system 72, a fuel pump 73, and a fuel reservoir 74. The engine further includes an electric starter motor 75, which is energised by the battery 76 upon operation of the starter switch 78. The air compressor 77 is driven by the belt 79 from the engine crankshaft pulley 80.

Mounted in the cylinder head 90 of the engine 70 is a fuel metering and injection unit 81, (one for each cylinder in a multi-cylinder engine). The metering and injection unit 81 receives fuel via the conduit 82 from the fuel pump 73 and receives air from the compressor 77 via the conduit 83. An air pressure regulator 84 is provided in the conduit 83 and the latter delivers air to the air manifold 85 to which each metering and injection unit 81 of each of the cylinders of the engine is connected to receive air.

The electronic control unit (ECU) 86 receives signals from a crankshaft speed and position sensor 87 via the lead 93 and an air flow sensor 88 located in the air intake system 71 via the lead 96 and the engine temperature sensor 84 via the lead 94 and ambient temperature (not shown). The ECU 86 is programmed to determines from all input signals the quantity of fuel required to be delivered to each of the cylinders of the engine, each cycle of the respective cylinder. This general type of ECU and the programming thereof is well-known in the art of electronically controlled fuel injection systems and will not be described here in further detail.

Figure 2:
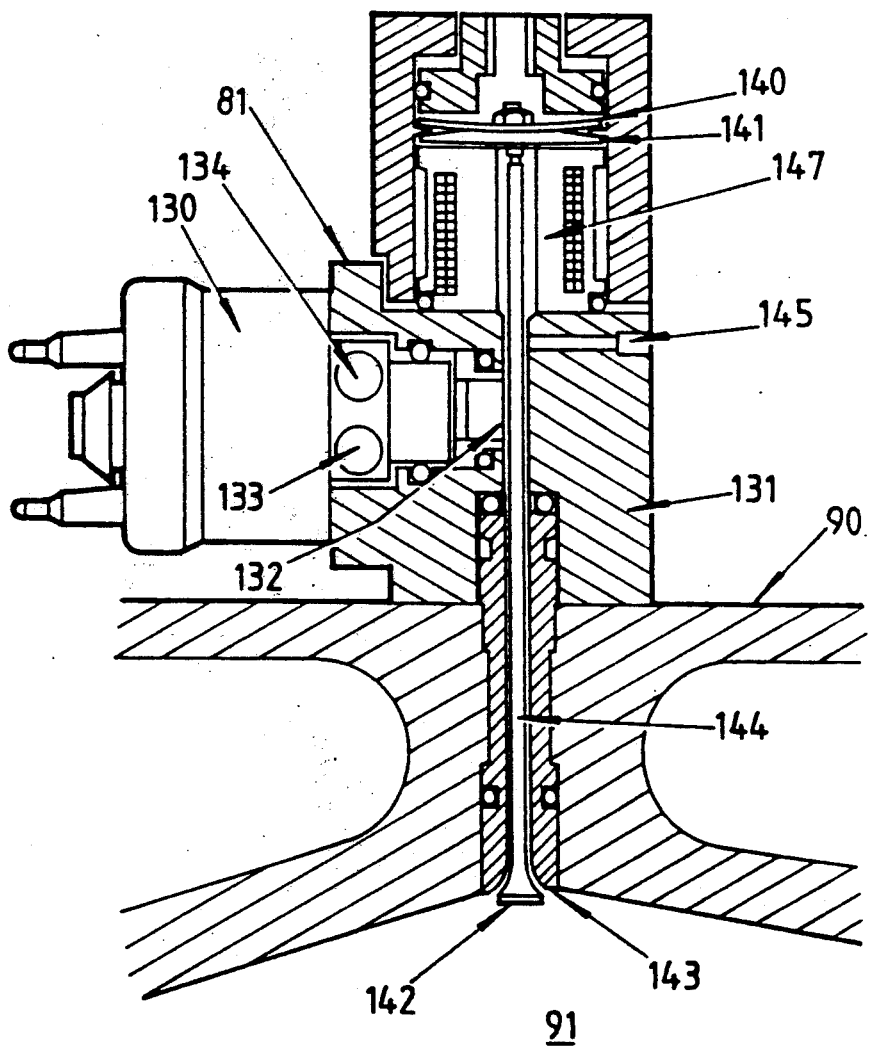
FIG. 2 is a sectional view through a typical form of metering and injector unit as used in the system shown in FIG. 1.

The fuel metering and injection unit 81 as shown in FIG. 2 incorporates a suitable fuel metering device 130, such an automotive type throttle body injector, coupled to an injector body 131 having a fuel chamber 132 therein. Fuel is delivered from the fuel pump 73 through fuel inlet port 133 to the metering device 130 which meters the amount of fuel supplied to the fuel chamber 132 per engine cycle in accordance with the engine fuel demand. Excess fuel supplied to the metering device is returned to a fuel reservoir 75 via fuel return port 134. The particular construction of the fuel metering device 130 is not critical to the present invention and any suitable device may be used.

The valve 143 of the injector nozzle 142 is coupled, via a valve stem 144, which passes through the fuel chamber 132, to the armature 141 of the solenoid 147 located within the injector body 131. The valve 143 is biased into the closed position by the disc spring 140 and is opened by energising the solenoid 147. The valve 143 is shown in the open position in FIG. 2. Energising of the solenoid 147 is controlled by the ECU 86 via the lead 95 in time relation to the engine cycle to effect delivery of the fuel from the fuel chamber 132 to a cylinder of the engine 70.

The fuel chamber 132 is in constant communication with the air manifold 85 via the air inlet port 145 and thus under normal operation is maintained charged with air at a substantially steady pressure. Upon energising of the solenoid 147 the valve 143 is displaced downwardly to open the nozzle 142 so that the metered quantity of fuel held in the fuel chamber 132 is carried by the high pressure air out of the fuel chamber 132 through the nozzle 142 into the combustion chamber 91 of a cylinder of the engine.

Further details of the operation of the fuel metering and injection systems incorporating a fuel chamber such as indicated at 132 in FIG. 2 is disclosed in U.S. Pat. No. 4,693,224 the disclosures of which is incorporated herein by reference.

It will be appreciated from the above description that the nozzle 142 is located within the cylinder head 90 of the engine, and in communication with the combustion chamber 91 defined within the engine cylinder. As above described, when the nozzle 142 is opened and the air supply available via the air inlet port 145 is above the pressure in the combustion chamber 91, air, with fuel from the fuel chamber 132 entrained therein, will flow through the nozzle 142 into the engine combustion chamber 91.

It will be appreciated that under normal operating conditions, the injection of the fuel into the combustion chamber is normally carried out before or shortly after the closing of the inlet port of the engine through which the air required to support the combustion of the fuel is provided. Normally the injection of the fuel into the combustion chamber is completed before the piston has reached the 45° before top dead centre position in the compression stroke. At that point in the compression stroke, the compression pressure is relatively low so that the pressure of the air supplied via the air port 145 is sufficiently above the compression pressure in the combustion chamber 91 to effect delivery of the fuel thereinto. Normally the pressure of the air supply to the air port is of the order of 400 to 500 kPa, and the compression pressure in the combustion chamber at opening of the nozzle 142 to inject the fuel is normally of the order of 100 kPa. The maximum compression pressure in the combustion chamber, without combustion, is of the order of 800 kPa.

The ECU 86 is programmed to receive a signal from the engine starter switch 78 when the switch is operated to energise the starter motor 75, so that the ECU may store a progressive total of the number of engine start-ups. The ECU 86 also receives information from an engine temperature sensor 72 and is programmed to keep a progressive total of the number of engine start-ups effected while the engine temperature is below a pre-selected value, that value, for example, being selected as indicative that the engine is starting from a cold condition. On the basis of these inputs, the ECU can keep a running total of the number of cold start-ups of the engine.

The ECU 86 is also programmed to determine when the number of cold start-ups reaches 150, or some other appropriately selected figure, indicating the vehicle has, on a statistical average, been operating for a particular period of time or in a motor vehicle, the vehicle has travelled a particular distance. This time or distance having been previously selected as an appropriate interval between successive cleaning operations of the injector nozzle.

The ECU has thus determined that the point has been reached in the engines operation life when the injector nozzle should be cleaned. The ECU must now determine when the operating conditions of the engine are suitable for carrying out the nozzle cleaning operation. That is, is the engine sufficiently warmed up and is the engine operating at a suitable speed and/or load where the nozzle cleaning operation will not significantly adversely affect the engine operation. To this end, the ECU is programmed to only commence the nozzle cleaning operation if the engine temperature is above a preselected value, and the engine speed is steady within a preselected speed range.

The ECU having determined that an injector nozzle cleaning operation is required, and the operation conditions are suitable, sets the timing of the commencement and termination of the open period of the injector nozzle 142 to extend into the high compression pressure and temperature area of the engine cycle and terminates the supply of fuel to the injector for the period of opening of the injector nozzle 142.

The flow of air from the combustion chamber 91 into the nozzle 142 during the portion of the compression stroke where the temperature of the compressed air is such that it will, and over a number of engine cycles, raise the temperature of the seat of the injector nozzle valve 143 and adjacent areas of the nozzle 142 to a temperature that will effect removal of the contaminants, such as carbon, from the surfaces, by the ignition and combustion of that carbon.

Typically the open period of the injector nozzle for the delivery of fuel when the engine is operating normally is 4 milliseconds at 2000 RPM and during the nozzle cleaning cycle is extended to typically 10 milliseconds. With a 60° BTDC commencement of injector opening this would result in the injector closing approximately 30° ATDC when the engine is operating at 2000 RPM. It will be appreciated that the actual time interval that the injector is open each cycle is not critical, but the injector must be open during a period when the pressure and temperature of the gas in the combustion chamber is sufficient to enter the injector nozzle and ignite the contaminant deposits therein. The pressure of the gas and the duration of opening of the injector nozzle can influence the extent of penetration of the hot gas into the nozzle, therefore it is desirable to select an open period that will prevent sensitive components of the nozzle being exposed to excessive heat. A similar process is continued over a number of successive engine cycles, sufficient to remove substantially all contaminate build up in the nozzle. It has been found that 300 to 500 cycles are normally adequate. In a multi-cylinder engine, the ECU is programmed to only carry out the nozzle cleaning operation on one cylinder at any one time. A set sequence of cleaning the nozzles of the respective cylinders is programmed into the ECU.

The nozzle cleaning procedure disclosed herein may be applied to all forms of direct injected internal combustion engines, including spark ignited and compression ignited engines, and both two stroke and four stroke cycle engines. Also the cleaning procedure may be applied to injectors that deliver liquid or gaseous fuels either alone or entrained in a carrier gas.

The claims defining the invention are as follows:

1. A method of operating an internal combustion engine fuel injection system wherein an individual metered quantity of fuel entrained in a gas is cyclically injected directly into each combustion chamber of an engine through a respective selectively openable injector nozzle, the method including controlling the operation of the injector nozzle of each combustion chamber to periodically maintain the injector nozzle open for a portion of at least one engine cycle, said portion of the engine cycle being while no fuel is being delivered to or through the injector nozzle and when the combustion chamber gases are at a temperature and pressure to pass into the open injector nozzle to raise the temperature therein sufficient to remove contaminate deposits in the injector nozzle.

2. A method of operating an internal combustion engine fuel injection system as claimed in claim 1, wherein in a multi cylinder engine said periodic opening of the injector nozzle is effected on the injector nozzle of only one combustion chamber during any one engine cycle.

3. A method of operating an internal combustion engine fuel injection system as claimed in claim 1, wherein said periodic opening of the injector nozzle of one combustion chamber is effected over a plurality of successive engine cycles.

4. A method of operating an internal combustion engine fuel injection system as claimed in claim 1, wherein said periodic opening of the injector nozzle is effected while the engine is operating in an over-run condition.

5. A method of operating an internal combustion engine fuel injection system as claimed in claim 1, wherein said periodic opening of the injector nozzle is effected while the engine is operating in a substantially steady state.

6. A method of operating an internal combustion engine fuel injection system as claimed in claim 5, wherein said periodic opening of the injector nozzle is effected while the engine is operating within a selected range of engine speed of rotation.

7. A method of operating an internal combustion engine fuel injection system as claimed in claim 1, wherein said periodic opening of the injector nozzle is effected while the engine is operating at a temperature above a predetermined value.

8. A method of operating an internal combustion engine fuel injection system as claimed in claim 1, wherein said periodic opening of the injector nozzle is initiated in response to completion of a preselected period of operation of the engine from the preceding periodic opening of the injector nozzle.

9. A method of operating an internal combustion engine fuel injection system as claimed in claim 1, wherein said periodic opening of the injector nozzle is initiated in response to completion of a preselected number of successive start-ups of the engine, when the engine temperature is below a preselected value, from the preceding opening of the injector nozzle.

10. A method of operating an internal combustion engine fuel injection system as claimed in claim 1, wherein said periodic opening of the injector nozzle is initiated only while the engine is operating in a predetermined range of engine load.

11. A method of operating an internal combustion engine fuel injection system as claimed in claim 1, wherein a continuous supply of the fuel delivery gas is available at the nozzle while the engine is operating, and a metered quantity of fuel is delivered into the fuel delivery gas each engine cycle, said delivery of fuel being effected prior to commencement of the passing of gas from the combustion chamber into the nozzle.

12. A method of operating an internal combustion engine fuel injection system wherein fuel is cyclically injected directly into each combustion chamber of an engine through a respective selectively openable injector nozzle, the method including the steps of:

maintaining a pressurized gas supply to the nozzle while the engine is operating;

delivering a metered quantity of fuel into the pressurized gas in each injector nozzle each engine cycle; and controlling the operation of the injector nozzle to periodically independently maintain each individual injector nozzle open while no fuel is being delivered to or through that injector nozzle and during a portion of at least one engine cycle when gas in the associated combustion chamber is at a temperature and pressure to pass from the combustion chamber into the open injector nozzle and to raise the temperature therein sufficient to combust contaminate deposits in the injector nozzle.

13. A method of operating an internal combustion engine fuel injection system as claimed in claim 12, wherein said periodic openings of the individual injector nozzle are timed to include a point of maximum compression pressure prior to ignition in the combustion chamber during said engine cycle.

14. A method of operating an internal combustion engine fuel injection system as claimed in claim 12, wherein said periodic openings of the individual injector nozzle are effected over a plurality of successive engine cycles.

15. A method of operating an internal combustion engine fuel injection system as claimed in claim 12, wherein said periodic openings of the individual injector nozzle of one combustion chamber are effected while the engine is operating in an over-run condition.

16. A method of operating an internal combustion engine fuel injection system as claimed in claim 12, wherein said periodic openings of the individual injector nozzle are effected while the engine is operating in a substantially steady state.

17. A method of operating an internal combustion engine fuel injection system as claimed in claim 16, wherein said periodic openings of the injector nozzle are effected while the engine is operating within a selected range of engine speed of rotation.

18. A method of operating an internal combustion engine fuel injection system as claimed in claim 12, wherein said periodic openings of the injector nozzle are effected while the engine is operating at a temperature above a predetermined value.

19. A method of operating an internal combustion engine fuel injection system as claimed in claim 12, wherein said periodic openings of the injector nozzle is initiated in response to completion of a preselected period of operation of the engine from the preceding periodic opening of the injector nozzle.

20. In an internal combustion engine fuel injection system a fuel injector, wherein a pressurized supply of gas is maintained while the engine is operating, and into which a metered quantity of fuel is delivered each engine cycle, arranged to inject fuel directly into each combustion chamber of an engine through a respective selectively openable injector nozzle, a programmed controller to cyclically open each injector nozzle in timed relation to the engine cycle, said controller being also programmed to periodically independently maintain each individual injector nozzle open while no fuel is being delivered to or through that injector nozzle and during a portion of at least one engine cycle when gas in the associated combustion chamber is at a temperature and pressure to pass from the combustion chamber into the open injector nozzle to raise the temperature therein sufficient to combust contaminate deposits in the injector nozzle.

21. An internal combustion engine fuel injection system as claimed in claim 20, wherein said controller is programmed so said periodic openings of the injector nozzle is timed to include a point of maximum compression pressure prior to ignition in the combustion chamber during said engine cycle.

22. An internal combustion engine fuel injection system as claimed in claim 20, wherein the controller is programmed so said periodic opening of the nozzle is effected while the engine is operating in a substantially steady state.

23. An internal combustion engine fuel injection system as claimed in claim 20, wherein the controller is programmed so said periodic opening of the injector nozzle is effected while the engine is operating within a selected range of engine speed of rotation.

24. An internal combustion engine fuel injection system as claimed in claim 20, wherein the controller is programmed so said periodic opening of the injector nozzle is effected while the engine is operating at a temperature above a predetermined value.

25. An internal combustion engine fuel injection system as claimed in claim 20, wherein the controller is programmed so said periodic opening of the injector nozzle is initiated in response to completion of a preselected period of operation of the engine from the preceding periodic opening of the nozzle.

* * * * *